United States Patent Office

2,709,172
Patented May 24, 1955

2,709,172

2,4-DIAMINOTHIAZOLE DERIVATIVES SUBSTITUTED IN THE 5-POSITION BY AN AROMATIC HYDROCARBON RADICAL

Raymond M. Dodson, Evanston, Ill., assignor to G. D. Searle & Co., Chicago, Ill., a corporation of Illinois No Drawing. Application December 17, 1951,
Serial No. 262,170

10 Claims. (Cl. 260—306.8)

The present invention relates to a new group of heterocyclic amines and, more particularly, to the 2,4-diaminothiazoles substituted in the 5-position by an aromatic hydrocarbon radical, and their salts. The compounds which constitute this invention can be represented as the bases of the structural formula $$\text{Ar}-\underset{S}{\text{C}}=\underset{N}{\text{C}}-\text{NHR}$$
$$\diagdown\text{C}\diagup$$
$$|$$
$$\text{NHR}$$

and their salts, wherein Ar is a lower aromatic hydrocarbon radical and the radicals R are members of the class consisting of hydrogen, lower alkanoyl and benzoyl radicals.

In the foregoing structural formula the radical Ar is an aromatic hydrocarbon radical containing 6 to 12 carbon atoms inclusive which is either of the lower aryl or lower aralkyl type as in the case of phenyl, tolyl, xylyl, napthyl, dimethylnaphthyl, fluorenyl and benzyl, phenethyl, phenylpropyl, naphthylmethyl, methylbenzyl and the like. The radical R can be a hydrogen, benzoyl or lower alkylcarbonyl radical such as acetyl, propionyl, butyryl, isobutyryl, valeryl, and caproyl.

The 2,4-diamines of the foregoing type form salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic, and related acids.

The compounds which constitute this invention are valuable intermediates in organic synthesis, particularly for the purpose of the formation of 2-amino-5-aralkyl-4(5)-thiazolones. The salts are of special value in medicinal chemistry because of a variety of useful pharmacodynamic actions and especially their analeptic potency.

The 2,4-diamino-5-aryl- and aralkyl-thiazoles are conveniently prepared by treatment of a nitrile of the structural formula $$\text{Ar}-\underset{\underset{\text{O}-SO_2-R}{|}}{\text{CH}}-\text{CN}$$

with a substantial equivalent of thiourea in an inert organic solvent, R being a lower hydrocarbon radical and Ar being defined as hereinabove.

These compounds are also prepared in excellent yield by first treating potassium cyanide and the arylsulfonyl chloride with an aldehyde of the type $$\text{Ar}-\text{CH}=\text{O}$$

in a water suspension and then treating this crude mixture with a solution of thiourea in alcohol. In this case there occurs formation as a by-product of a sulfone of the type $$\text{Ar}-\underset{\underset{SO_2-R}{|}}{\text{CH}}-\text{CN}$$

The preparation and properties of these sulfones will be the subject of a future application.

The examples below are given to illustrate in further detail certain of the compounds which constitute the invention and convenient methods for their preparation. However, the details set forth are in no way to be construed as limiting the invention in spirit or in scope. It will be apparent to chemists skilled in the art of organic synthesis that many modifications in materials and methods can be used without departing from the invention. In these examples temperatures are given in degrees centigrade (° C.) and quantities of materials in parts by weight.

*Example 1*

A mixture of 530 parts of benzaldehyde, 880 parts of benzenesulfonyl chloride, 245 parts of sodium cyanide and 1000 parts of water is allowed to stand for 3 hours at 0–5° C. with occasional shaking. The cream-colored solid is separated by filtration, then dissolved in a mixture of 1000 parts of acetone, 1000 parts of ethanol and 1000 parts of ether. The undissolved material is separated from the solution by filtration and discarded. The addition of 1500 parts of ice to the cold filtrate precipitates an oil which solidifies on standing at 0° C. Recrystallized from ethanol the α-cyanobenzyl benzenesulfonate is obtained in crystals melting at 57.5–58.5° C.

*Example 2*

A mixture of 600 parts of α-cyanobenzyl benzenesulfonate, 168 parts of thiourea and 800 parts of acetone is stirred at room temperature until solution is achieved (15–30 minutes). The resulting solution is allowed to stand overnight at room temperature and is then diluted with water until slightly cloudy. 2,4-diamino-5-phenyl-thiazole benzenesulfonate slowly precipitates on standing. The salt is purified by precipitating it from alcohol solution by addition of ether. The crystals melt at 261–262° C. with decomposition. The salt is slightly soluble in alcohol but insoluble in the other common organic solvents and in water.

*Example 3*

200 parts of 2,4-diamino-5-phenylthiazole benzenesulfonate are thoroughly mixed with 100 parts of a 15% aqueous potassium hydroxide solution. The residual solid is separated by filtration and is washed with water. The slightly moist solid is dissolved in 50 parts of acetic anhydride. The clear colorless solution, on standing at room temperature for 2 hours, sets to a thick paste. By filtration of this material, 2,4-diacetamino-5-phenyl-thiazone, melting at 232–233.5° C. is obtained. Crystallization of the product from a mixture of acetone and ether raises its melting point to 233.5–234° C. It has the structural formula $$\text{C}_6\text{H}_5-\underset{S}{\text{C}}=\underset{N}{\text{C}}-\text{NH}-\text{CO}-\text{CH}_3$$
$$\diagdown\text{C}\diagup$$
$$|$$
$$\text{NH}-\text{CO}-\text{CH}_3$$

*Example 4*

2,4-diamino-5-phenylthiazole is obtained from the 2,4-diamino-5-phenylthiazole benzenesulfonate by thoroughly mixing the salt with dilute (1:1) ammonium hydroxide. The residual solid is separated by filtration, washed thoroughly with anhydrous ether and dried in a stream of air. It melts at about 157° C. with decomposition. Treatment with alcoholic hydrogen chloride yields a high melting hydrochloride.

*Example 5*

To a mixture of 120 parts of phenylacetaldehyde and 176 parts of benzenesulfonyl chloride maintained at 0°

C., there are added in rapid succession 200 parts of sodium cyanide and 200 parts of cold water. The cooled mixture, which becomes a creamy paste almost immediately, is swirled constantly for 30 minutes. After standing at 0° C. for 30 minutes it is then treated with 500 parts of cold water, swirled for 2 hours longer and then freed of the aqueous phase by decantation. The residual semi-solid is triturated with three 500-part portions of cold ethanol. The undissolved portion is collected on a filter and recrystallized from 95% ethanol. The α-cyano-β-phenethyl benzenesulfonate thus obtained melts at about 56.0–56.5° C.

Example 6

To a solution of 47.5 parts of α-cyano-β-phenethyl benzenesulfonate in 400 parts of warm 95% ethanol, 12.6 parts of thiourea and 25 parts of sodium iodide are added and the mixture is heated under reflux for 21 hours and allowed to stand at room temperature for a further 48 hours. The resulting mixture consists of a light yellow-colored liquid phase and an almost white platelet-like solid. The addition of a large excess of water to this mixture causes the solution of the platelets, followed shortly by the precipitation of an almost white granular solid. This substance is separated by filtration. After three recrystallizations from a mixture of absolute ethanol and ether the 2,4-diamino-5-benzylthiazole benzenesulfonate melts at about 246–247° C. with decomposition.

Example 7

20 parts of 2,4-diamino-5-benzylthiazole benzenesulfonate are thoroughly mixed with 200 parts of a 10% sodium hydroxide solution. The resulting white solid is separated by filtration and washed with two 150-part portions of water. This material after being dried in vacuo over phosphorus pentoxide constitutes pure 2,4-diamino-5-benzylthiazole as a hygroscopic powder which tends to form a monohydrate. The anhydrous compound has the structural formula $$C_6H_5-CH_2-C=\!=\!=C-NH_2$$
$$\phantom{C_6H_5-CH_2-}|\phantom{=\!=\!=}|$$
$$\phantom{C_6H_5-CH_2-}S\phantom{=\!=}N$$
$$\phantom{C_6H_5-CH_2-}\backslash\phantom{=}/$$
$$\phantom{C_6H_5-CH_2-}C$$
$$\phantom{C_6H_5-CH_2-}|$$
$$\phantom{C_6H_5-CH_2-}NH_2$$

Example 8

2,4-diamino-5-benzylthiazole is acetylated with acetic anhydride by the method of Example 3. After repeated recrystallizations from acetic anhydride the 2,4-diacetamino-5-benzylthiazole melts at about 248.5–249.0° C.

Example 9

To a stirred suspension of 17 parts of 2,4-diamino-5-benzylthiazole benzenesulfonate in 100 parts of water, there are added 100 parts of a 20% sodium hydroxide solution. The 2,4-diamino-5-benzylthiazole thus liberated is separated by filtration and washed twice with water. A suspension of the white diamine in 300 parts of dilute hydrochloric acid is then heated at the boiling point for 10 minutes. The resulting clear colorless solution is poured into 500 parts of ice water and neutralized with concentrated ammonium hydroxide. The voluminous white precipitate thus formed is separated by filtration and dried in vacuo over anhydrous magnesium sulfate. Recrystallized from absolute ethanol the 2-amino-5-benzyl-4(5)-thiazolone melts at about 217–219° C. with decomposition.

Example 10

α-Cyano-γ-phenyl-n-propyl benzenesulfonate (M. P. 45.5–46.0° C. from ethanol) is prepared by the method of Example 5 from dihydrocinnamaldehyde, benzenesulfonyl chloride and sodium cyanide.

Example 11

A solution of 62 parts of α-cyano-γ-phenyl-n-propyl benzenesulfonate in 500 parts of 95% ethanol is treated with 15.2 parts of thiourea and 30 parts of sodium iodide and heated at reflux temperature for 16 hours. The mixture then consists of a light yellow liquid phase and a white platelet-like solid. The addition of a large excess of water to this mixture causes this solution of the platelets followed by the precipitation of a tan-colored solid. After standing for 2 hours the tan-colored material is collected on a filter and dried in vacuo over phosphorus pentoxide. Recrystallized from absolute ethanol the 2,4-diamino-5-(β-phenethyl)thiazole benzenesulfonate melts at about 233–235° C. with decomposition.

Example 12

17 parts of 2,4-diamino-5-(β-phenethyl)thiazole benzenesulfonate are thoroughly mixed with 200 parts of sodium hydroxide solution. On standing the resulting oil solidifies into a light tan-colored solid which, after being thoroughly washed with water, melts at about 80–85° C. with decomposition. Analysis indicates this to be the monohydrate of 2,4-diamino-5-(β-phenethyl)-thiazole, which has the structural formula $$C_6H_5-CH_2-CH_2-C=\!=\!=C-NH_2$$
$$\phantom{C_6H_5-CH_2-CH_2-}|\phantom{=\!=\!=}|$$
$$\phantom{C_6H_5-CH_2-CH_2-}S\phantom{=\!=}N$$
$$\phantom{C_6H_5-CH_2-CH_2-}\backslash\phantom{=}/$$
$$\phantom{C_6H_5-CH_2-CH_2-}C$$
$$\phantom{C_6H_5-CH_2-CH_2-}|$$
$$\phantom{C_6H_5-CH_2-CH_2-}NH_2$$

Example 13

Acetylation of 2,4-diamino-5-(β-phenethyl)thiazole by the method of Example 3 yields the 2,4-diacetamino-5-(β-phenethyl)thiazole which, recrystallized repeatedly from acetic anhydride, melts at about 227–227.5° C.

Example 14

2-amino-5-(β-phenethyl)-4(5)thiazolone is prepared from 2,4-diamino-5-(β-phenethyl)thiazole benzenesulfonate by the procedure of Example 9. It is obtained as a white solid which, after repeated recrystallization from absolute ethanol, melts at about 215–218° C. with decomposition.

I claim:

1. A member of the group consisting of the bases of the structural formula $$Ar-C=\!=\!=C-NHR$$
$$\phantom{Ar-}|\phantom{=\!=\!=}|$$
$$\phantom{Ar-}S\phantom{=\!=}N$$
$$\phantom{Ar-}\backslash\phantom{=}/$$
$$\phantom{Ar-}C$$
$$\phantom{Ar-}|$$
$$\phantom{Ar-}NHR$$

and salts thereof wherein Ar is a member of the class consisting of phenyl and phenyl-(lower alkyl)-radicals and the radicals R are members of the class consisting of hydrogen, lower alkanoyl and benzoyl radicals.

2. The salts of 2,4-diamino-5-phenylthiazole.

3. The 2,4-dialkanoylamino-5-phenylthiazoles of the structural formula $$C_6H_5-C=\!=\!=C-NH-CO-(lower\ alkyl)$$
$$\phantom{C_6H_5-}|\phantom{=\!=\!=}|$$
$$\phantom{C_6H_5-}S\phantom{=\!=}N$$
$$\phantom{C_6H_5-}\backslash\phantom{=}/$$
$$\phantom{C_6H_5-}C$$
$$\phantom{C_6H_5-}|$$
$$\phantom{C_6H_5-}NH-CO-(lower\ alkyl)$$

4. 2,4-diacetylamino-5-phenylthiazole.

5. The salts of the 2,4-diamino-5-phenylalkylthiazoles of the structural formula $$C_6H_5-Alk-C=\!=\!=C-NH_2$$
$$\phantom{C_6H_5-Alk-}|\phantom{=\!=\!=}|$$
$$\phantom{C_6H_5-Alk-}S\phantom{=\!=}N$$
$$\phantom{C_6H_5-Alk-}\backslash\phantom{=}/$$
$$\phantom{C_6H_5-Alk-}C$$
$$\phantom{C_6H_5-Alk-}|$$
$$\phantom{C_6H_5-Alk-}NH_2$$

wherein Alk is a lower alkylene radical.

6. The salts of the 2,4-diamino-5-benzylthiazole.

7. The salts of the 2,4-diamino-5-phenylethylthiazole.

8. In the process of preparing the compounds of the structural formula

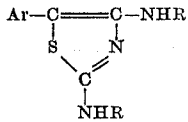

wherein Ar is a member of the class consisting of phenyl and phenyl-(lower alkyl)-radicals and the radicals R are members of the class consisting of hydrogen, lower alkanoyl and benzoyl radicals, the step which comprises treatment of a cyanide of the structural formula

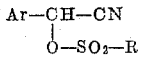

with a substantial equivalent of thiourea, R being a lower hydrocarbon radical and Ar being defined as hereinabove.

9. In the process of preparing the compounds of the structural formula

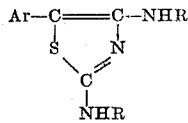

wherein Ar is a member of the class consisting of phenyl and phenyl-(lower alkyl)-radicals and the radicals R are members of the class consisting of hydrogen, lower alkanoyl and benzoyl radicals, the step which comprises treatment of a cyanide of the structural formula

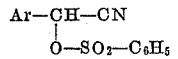

with a substantial equivalent of thiourea.

10. In the process of preparing 2,4-diamino-5-phenylthiazole the step which comprises treatment of α-cyanobenzyl benzenesulfonate with thiourea.

References Cited in the file of this patent

UNITED STATES PATENTS 2,468,401   King et al. _____ Apr. 26, 1949

FOREIGN PATENTS 729,853   Germany _____ Jan. 4, 1943

OTHER REFERENCES

Davies et al.: J. Chem. Soc., vol. 1950, pp. 3491–4.
Cook et al.: J. Chem. Soc., 1948, part II, pp. 1262–67.
Ganapathi et al.: C. A. 40, col. 4056 citing Proc. Indian Acad. Sci. 22A, 343–58 (1945).